(12) United States Patent
Krampitz et al.

(10) Patent No.: US 6,699,456 B1
(45) Date of Patent: Mar. 2, 2004

(54) METHOD FOR PRODUCING LITHIUM METAL OXIDES

(75) Inventors: Horst Krampitz, Pohle (DE); Michael Fooken, Seelze (DE)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/673,015

(22) PCT Filed: Mar. 31, 1999

(86) PCT No.: PCT/EP99/02227

§ 371 (c)(1),
(2), (4) Date: Nov. 30, 2000

(87) PCT Pub. No.: WO99/51526

PCT Pub. Date: Oct. 14, 1999

(30) Foreign Application Priority Data

Apr. 7, 1998 (DE) .......................... 198 15 611

(51) Int. Cl.⁷ ...................... C01D 1/02; C01G 45/12; H01M 4/50; H01M 4/58
(52) U.S. Cl. .............. 423/594.15; 423/599; 429/218.1; 429/224; 429/231.1; 429/231.95
(58) Field of Search ................. 423/593, 599; 429/218.1, 224, 231.1, 231.95

(56) References Cited

U.S. PATENT DOCUMENTS 5,770,018 A * 6/1998 Saidi ..................... 204/157.15

FOREIGN PATENT DOCUMENTS

| EP | 0675079 A1 | * 10/1995 | ........... C01G/45/02 |
|----|-----------|-----------|----------------------|
| EP | 0717455 A1 | * 6/1996 | ........... C01G/45/00 |
| EP | 0816292 A1 | * 1/1998 | ........... C01G/45/00 |
| JP | 60225358 | * 11/1985 | ........... H01M/4/50 |
| WO | WO98/38133 | * 9/1998 | ........... C01G/45/00 |

* cited by examiner

*Primary Examiner*—Stanley S. Silverman
*Assistant Examiner*—Jonas N. Strickland
(74) *Attorney, Agent, or Firm*—Scott Jacobson, Esq

(57) ABSTRACT

The invention relates to a method for producing lithium metal oxides, comprising at least one annealing stage. The inventive method is characterized in that at least one annealing stage consists of a treatment with microwave energy.

12 Claims, No Drawings

METHOD FOR PRODUCING LITHIUM METAL OXIDES

The present invention relates to a process for preparing lithium metal oxides by treatment with microwave energy, such a lithium metal oxide itself and its use as cathode material for electrochemical cells.

Lithium metal oxides are playing an evermore important role in electrochemical cells, since their use as cathode material makes it possible to achieve the desired, high energy densities. Rechargeable lithium secondary batteries produced using these oxides are used in many applications, for example portable electronic equipment such as video cameras, mobile telephones or laptop computers. In the future, traction batteries will also be produced using this technology.

In processes for preparing lithium metal oxides, it is usual to prepare intimate mixtures of lithium compounds with the appropriate metal compounds and, depending on the process, dry them if necessary. The mixture is subsequently heated in one or more stages, depending on the process.

Thus, DE 43 27 760 describes a process for preparing lithium magnesium oxide which serves as active material of a positive lithium secondary battery. In this process, a mixture of manganese oxide with lithium formate and/or lithium acetate is heated at from 550 to 800° C. The reaction time is from 10 to 100 hours.

A further process for preparing a lithium manganese oxide which is of interest as an intercalation compound for secondary batteries is claimed in U.S. Pat. No. 5,135,732. There, stoichiometric amounts of an aqueous solution of lithium hydroxide and magnesium acetate are mixed in the presence of a base to form a gel-like precipitate. This is subsequently dried to form a xerogel and then heated at a temperature of from 200 to 600° C. The hold time in the heat treatment process is 16 hours.

WO 97/20773 explicitly discloses a process for preparing a lithium manganese oxide as intercalation compound for lithium secondary batteries, in which a lithium hydroxide is heated with manganese carbonate in 3 steps at 450, 550 and 750° C. The reaction time is a total of 144 hours.

U.S. Pat. No. 5,629,119 discloses the preparation of $LiNiO_2$ as cathode-active material of lithium secondary batteries. Here, lithium hydroxide is mixed with $\beta$-$Ni(OH)_2$ and the mixture is heated in two stages at 650 and 750° C. The total heat treatment time is 30 hours.

The same publication also describes the preparation of cathode-active lithium metal oxides, which is carried out by mixing a lithium salt and $\beta$-$Ni(OH)_2$ with either $Co_3O_4$ or $MnO_2$ and subsequently heating the mixture in two stages at 650 and 750° C. Here too, the total heat treatment time is 30 hours.

Furthermore, EP 0 717 455 discloses heat treatment in a rotary tube furnace for preparing lithium manganese oxides. In this process, lithium and manganese compounds are mixed and heated in the rotary tube furnace at from 200 to 800° C. The hold times here are from 0.5 to 10 hours. A hold time of 2 hours is explicitly disclosed.

In all the abovementioned prior art processes which concern the preparation of cathode material based on lithium metal oxides, the heat treatment is effected by means of conventional heating techniques, i.e. by means of the transfer of thermal energy. According to the abovementioned processes, heat treatment processes at temperatures in the range from 200 to 800° C., which can sometimes take longer than 100 hours, are necessary.

In view of the above prior art, it is an object of the present invention to provide a process which makes possible very short heat treatment times in the preparation of lithium metal oxides.

This object is achieved by a process for preparing lithium metal oxides which comprises at least one heat treatment step, characterized in that the heat treatment step or steps include(s) a treatment with microwave energy.

As can be seen from the above, a treatment with microwave energy is carried out during the heat treatment in the process of the invention.

In general, the frequencies of the microwave radiation used in the process of the invention are in the range from 0.9 to 30 GHz. Preference is given to frequencies of 0.915, 2.45 and 28 GHz. In particular, the frequency 0.915 GHz is used.

The heat treatment can be carried out on material which is either static or in motion. The heat treatment is preferably carried out on material which is in motion, particularly preferably using rotary furnaces.

It is especially when using microwave radiation in the decimeter range that significantly shorter heat treatment times can be achieved. In general, the heat treatment times in the process of the invention are from about 10 seconds to 60 minutes, preferably from about 1 to 20 minutes, in particular from about 2 to 8 minutes.

In principle, all lithium compounds can be used in the process of the invention. However, preference is given to using $Li_2O$, $LiOH$, $LiCl$, $LiNO_3$, $Li_2CO_3$, $Li_2SO_4$, lithium carboxylates such as lithium formate or lithium acetate, or a mixture of two or more thereof.

As regards the metals used in the process of the invention, there are in principle no restrictions. Preference is given to using a compound which comprises B, Al, Ti, V, Cr, Mn, Fe, Co, Ni, Zr, Nb, Mo, Ru or W.

In particular, manganese compounds are used in the process of the invention. Here too, there are in principle no restrictions. However, preference is given to using $MnO$, $MnO_2$, $Mn_2O_3$, $Mn_3O_4$, $MnOOH$, $MnCO_3$, $MnSO_4$, $Mn(NO_3)_2$, manganese carboxylates such as manganese formate or manganese acetate, or a mixture of two or more of these compounds.

Lithium metal oxides which can be prepared by the process of the invention are in principle all such oxides, provided that lithium can be liberated electrochemically from these oxides, i.e. provided that the metals apart from lithium present in the oxide are not in their highest oxidation state.

Specific examples are:

$Li_xTiO_2$ ($0 < x \leq 1$), $Li_xTi_2O_4$ ($0 < x \leq 2$), $Li_xV_2O_4$ ($0 < x \leq 2.5$), $Li_xV_2O_3$ ($0 < x < 3.5$), $Li_xVO_2$ ($0 < x \leq 1$), $Li_xCr_2O_3$ ($0 < x \leq 3$), $Li_xCr_3O_4$ ($0 < x \leq 3.8$), $Li_xMnO_2$ ($0 < x \leq 2$), $Li_xMn_2O_4$ ($0 < x \leq 2$), $Li_xMnO_3$ ($0 < x \leq 1$), $Li_xFe_2O_3$ ($0 < x \leq 2$), $Li_xFe_3O_4$ ($0 < x \leq 2$), $LiCoO_2$, $LiNiO_2$, $Li_xZrO_2$ ($0 < x \leq 1$), $Li_xNbO_2$ ($0 < x \leq 2$), $Li_xMoO_2$ ($0 < x \leq 2$), $Li_xRuO_2$ ($0 < x \leq 1$), $Li_xWO_2$ ($0 < x \leq 1$), $Li_xWO_3$ ($0 < x \leq 1$), or mixtures of two or more thereof.

It is also possible for the lithium metal oxides prepared in the process of the invention to contain, in addition, a further metal or mixture of two or more metals as dopant. As dopant, preference is given to using a metal of group IIa, IIIa, IVa, IIb, IIIb, IVb, VIb, VIIb or VIII of the Periodic Table or a mixture of two or more thereof, in particular iron, cobalt, nickel, titanium, boron, aluminium or a mixture of two or more thereof.

In the process of the invention, such metal-doped lithium manganese oxides are prepared using a compound, preferably a salt, of a metal or a mixture of two or more thereof, as defined above, preferably an iron, cobalt or nickel salt or a mixture of two or more thereof, in the desired amount.

The conversion of the starting materials into the mixtures can, in the process of the invention, be carried out by all conceivable methods. For example, a possibility is reaction under hydrothermal conditions, i.e. preparation from heated aqueous solutions at subatmospheric pressures. Details of such methods may be found in DE-A 196 54 688.5, which is fully incorporated by reference into the present application.

The reaction can also be followed by one or more washing steps to remove dissolved impurities. In addition, the product obtained in the reaction in the present process can additionally be dried, if desired using microwave energy.

A reduction of the lithium content if a relatively large amount of lithium has been used or a general reduction of this content after the actual reaction can be carried out by means of an acid leaching process which is preferably carried out before the optional drying or the heat treatment. It should be noted here that removal of the aqueous phase can be carried out before drying, although this is generally not necessary, e.g. in the case of spray drying.

The crystallinity and the specific surface area of the lithium metal oxide obtained by the process of the invention can be influenced by targeted control of temperature, pressure and reaction time during the reaction and/or drying and also by targeted control of the frequencies of the microwave radiation used, the pressure and the reaction time in the heat treatment process.

The particle size of the lithium metal oxide obtained according to the invention can be influenced by prior wet or dry milling of the metal raw materials used. Likewise, milling of the wet or dried lithium metal oxide to reduce the particle size is possible.

In the present process, the following reaction variants in particular can be successfully carried out:

prepared according to the invention, a carbon-containing substance such as graphite or coke is particularly suitable as host material for the anode.

Accordingly, the present invention also provides a lithium metal oxide obtainable by a process which comprises at least one heat treatment step, characterized in that the heat treatment step or steps include(s) a treatment with microwave energy.

Furthermore, the present invention also provides for the use of a lithium metal oxide obtainable by a process which comprises at least one heat treatment step which includes a treatment with microwave energy as cathode material for electrochemical cells or as part of such cathode material.

Here, the lithium metal oxide, if desired in combination with a binder such as PTFE and carbon black, is the cathode while the anode preferably comprises, as host material, a carbon-containing substance as defined above or metallic lithium.

When using the lithium metal oxide described here as cathode, there are in principle no particular restrictions regarding the choice of anode. The compounds used only have to be able to incorporate intercalated lithium ions and have a higher electrochemical activity than the cathode.

The preparation of the lithium metal oxide of the invention or prepared according to the invention as battery cathode material is carried out in a manner known per se. In an electrochemical cell, this cathode material can be used in a manner known per se opposite an anode which takes up lithium cations. The electrodes of such cells in the fully assembled and closed state are usually uncharged, i.e. all available lithium is incorporated in the positive electrode while the host structure of the negative electrode is in the state where it is not loaded with lithium. On charging for the first time, the lithium migrates from the positive host lattice (cathode) and is incorporated into the negative host lattice (anode), preferably a carbon matrix. Any proportion of the lithium ions which becomes bound irreversibly to the carbon matrix and is thus no longer available to the further intercalation mechanism can be compensated for by a super-stoichiometric amount of lithium in the lithium metal oxide.

The in-principle structure of such electrochemical cells is known and is described, for example, by J. M. Tarascon in J. Electrochem. Soc. 140, p. 3071 ff.

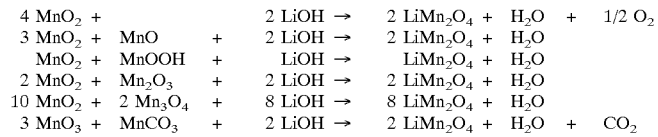

The lithium metal oxide of the invention or prepared according to the invention is preferably an intercalation compound. Such compounds can store active $Li^+$ ions in a host lattice, with the lithium being incorporated in interstitial sites in the lattice of the host material. Accordingly, such intercalation compounds are particularly useful for electrochemical cells. The incorporation and release can be effected electrochemically by means of an electrolyte which conducts lithium ions and has high reversibility, preferably $LiClO_4$, $LiBF_4$, $LiPF_6$, $LiSO_3CF_3$, $LiAsF_6$. If two different intercalation compounds having very different electrochemical potentials are combined, this gives an accumulator in which lithium ions migrate back and forth between the host materials during the charging and discharging process. Electrochemical cells of this type are known as lithium ion cells. When using a lithium metal oxide of the invention or Thus, the present invention likewise provides an electrochemical cell, characterized in that it has at least one cathode comprising the lithium metal oxide prepared according to the invention.

The present invention will now be illustrated by means of examples.

EXAMPLES

The examples concern the heat treatment of a lithium manganese oxide having the composition $Li_{1.05}Mn_2O_{4.55}$, where manganese is in an oxidation state of 3.9, and a BET surface area of 78 $m^2/g$. The aim of the heat treatment is reduction of the oxidation state of manganese to about 3.5, a reduction in the proportion of oxygen to about 4.0 and a reduction of the BET surface area to about 1.5 $m^2/g$.

Example 1

1000 g of a lithium manganese oxide as described above were placed in a dish made of aluminium oxide ceramic as a 2 cm thick layer.

The sample together with the dish was introduced into a microwave oven which was provided with a platinum-rhodium temperature sensor to monitor the temperature. Microwave energy was introduced by means of a 2.45 GHz magnetron which was regulated via the temperature sensor.

After 15 minutes, the desired heat treatment temperature of 800° C. had been reached. This temperature was then held for a further 15 minutes. As can be seen from Table 1, the desired heat treatment effect was achieved.

Comparative Example 1

As in Example 1, 1000 g of lithium manganese oxide in a 2 cm thick layer in a dish made of aluminium oxide ceramic were used.

A muffle furnace provided with resistance heating was preheated to 800° C. The sample with dish was introduced into the furnace and heated for 30 minutes at a constant furnace temperature of 800° C. After the 30-minute heat treatment, a temperature of only 230° C. had been reached in the lithium manganese oxide. As can be seen from Table 1, no heat treatment effect could be achieved.

TABLE 1

Example 1 and Comparative Example 1

|  | Example 1 | Comparative Example 1 |
| --- | --- | --- |
| Empirical formula | $Li_{1.02}Mn_2O_{4.04}$ | $Li_{1.04}Mn_2O_{4.42}$ |
| Oxidation state of Mn | 3.54 | 3.88 |
| BET surface area ($m^2/g$) | 1.3 | 78 |

Example 2

A lithium manganese oxide as described above was passed at a throughput of 90 kg/h through a ceramic, microwave-permeable rotating tube having an internal diameter of 40 cm which was heated for a length of 4 m. To provide good mixing of the material being reacted, the rotating tube was equipped with a transport screw. The temperature during the residence time of the lithium manganese oxide in the rotating tube was held at 800° C. The speed of rotation of the rotating tube was set such that the residence time of the lithium manganese oxide in the heated zone of the rotating tube was 30 minutes.

The tube was heated by means of two magnetrons having a power of 30 kW each. The frequency of the microwaves used was 0.915 GHz.

As can be seen from the table below, the lithium manganese oxide obtained met the expectations formulated above.

Comparative Example 2

A muffle furnace was charged with 500 kg of the above-mentioned lithium metal oxide and brought to a temperature of 800° C.

After 160 hours, the heat treatment was interrupted and the temperature in the middle of the sample was measured. This was only 580° C. The heat treatment process was then stopped, since it could be seen that it is impossible to achieve the desired temperature in all of the sample within a time acceptable for large-scale production.

The values shown in Table 2 below in respect of Example 2 are based on the analysis of the sample located in the middle, which was at a temperature of 580° C. after 160 hours.

TABLE 2

Example 2 and Comparative Example 2

|  | Example 2 | Comparative Example 2 |
| --- | --- | --- |
| Empirical formula | $Li_{1.0}Mn_2O_{4.0}$ | $Li_{1.06}Mn_2O_{4.15}$ |
| Oxidation state of Mn | 3.5 | 3.71 |
| BET surface area ($m^2/g$) | 1.5 | 9.5 |

What is claimed is:

1. A process for preparing lithium metal oxide comprising:
   providing a mixture of at least one lithium compound and at least one metal compound;
   dry mixing said mixture using a microwave-permeable rotary tube furnace; and
   heat treating said mixture while in motion in said microwave-permeable rotary tube furnace with microwave energy to form a lithium metal oxide.

2. The process according to claim 1, in which the at least one lithium compound is selected from the group consisting of $Li_2O$, $LiOH$, $LiCl$, $Li_2CO_3$, $Li_2SO_4$, lithium carboxylates and mixtures of two or more of these compounds.

3. The process according to claim 2, in which the at lease one metal compound is a manganese compound.

4. The process according to claim 3, in which the manganese compound is selected from the group consisting of $MnO$, $MnO_2$, $Mn_2O_3$, $Mn_3O_4$, $MnOOH$, $MnCO_3$, $MnSO_4$, $Mn(No_3)_2$, manganese carboxylates and mixtures of two or more of these compounds.

5. The process according to claim 4, which is carried out with a microwave radiation in a frequency range of 0.9 to 30 GHz.

6. The process according to claim 2, which is carried out with a microwave radiation in a frequency range of 0.9 to 30 GHz.

7. The process according to claim 3, which is carried out with a microwave radiation in a frequency range of 0.9 to 30 GHz.

8. The process according to claim 1, in which the at least one metal compound is a manganese compound.

9. The process according to claim 8, in which the manganese compound is selected from the group consisting of $MnO$, $MnO_2$, $Mn_2O_3$, $Mn_3O_4$, $MnOOH$, $MnCO_3$, $MnSO_4$, $Mn(No_3)_2$, manganese carboxylates and mixtures of two or more of these compounds.

10. The process according to claim 9, which is carried out with a microwave radiation in a frequency range of 0.9 to 30 GHz.

11. The process according to claim 8, which is carried out with a microwave radiation in a frequency range of 0.9 to 30 GHz.

12. The process according to claim 1, which is carried out with a microwave radiation in a frequency range of 0.9 to 30 GHz.

* * * * *